United States Patent
Xu

(10) Patent No.: US 10,341,694 B2
(45) Date of Patent: Jul. 2, 2019

(54) DATA PROCESSING METHOD AND LIVE BROADCASTING METHOD AND DEVICE

(71) Applicant: ALIBABA GROUP HOLDING LIMITED, Grand Cayman (KY)

(72) Inventor: Gang Xu, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/669,127

(22) Filed: Aug. 4, 2017

(65) Prior Publication Data

US 2018/0041783 A1 Feb. 8, 2018

(30) Foreign Application Priority Data

Aug. 5, 2016 (CN) .......................... 2016 1 0639385

(51) Int. Cl.

| | |
|---|---|
| *G10L 15/22* | (2006.01) |
| *H04N 21/233* | (2011.01) |
| *G10L 15/26* | (2006.01) |
| *H04N 21/2187* | (2011.01) |
| *H04N 21/234* | (2011.01) |
| *H04N 21/2343* | (2011.01) |
| *H04N 21/488* | (2011.01) |
| *H04N 21/236* | (2011.01) |
| *H04N 21/81* | (2011.01) |

(52) U.S. Cl.
CPC ......... *H04N 21/2335* (2013.01); *G10L 15/26* (2013.01); *G10L 15/265* (2013.01); *H04N 21/2187* (2013.01); *H04N 21/233* (2013.01); *H04N 21/23406* (2013.01); *H04N 21/23614* (2013.01); *H04N 21/234309* (2013.01); *H04N 21/4884* (2013.01); *H04N 21/8133* (2013.01)

(58) Field of Classification Search
None
See application file for complete search history.

(56) References Cited

U.S. PATENT DOCUMENTS

| | | | | |
|---|---|---|---|---|
| 5,664,227 A | * | 9/1997 | Mauldin | ........... G06F 17/30796 |
| | | | | 707/E17.028 |
| 6,205,524 B1 | * | 3/2001 | Ng | ........................ G06F 13/161 |
| | | | | 345/541 |
| 6,336,093 B2 | | 1/2002 | Fasciano | |
| 6,342,904 B1 | * | 1/2002 | Vasudevan | ........... H04N 19/587 |
| | | | | 375/E7.253 |
| 6,360,202 B1 | * | 3/2002 | Bhadkamkar | .......... G11B 27/10 |
| | | | | 348/E5.009 |
| 6,480,819 B1 | | 11/2002 | Boman et al. | |

(Continued)

OTHER PUBLICATIONS

International Search Report and Written Opinion for Application No. PCT/US2017/045472, dated Oct. 18, 2017, 9 pages.

*Primary Examiner* — Abul K Azad
(74) *Attorney, Agent, or Firm* — Sheppard Mullin Richter & Hampton LLP

(57) ABSTRACT

Data processing methods, live broadcasting methods and devices are disclosed. An example data processing method may comprise converting audio and video data into broadcast data in a predetermined format, and performing speech recognition on audio data in the audio and video data, and adding the text information obtained from speech recognition into the broadcast data. In real time, text information obtained from speech recognition according to the audio data can be inserted.

24 Claims, 6 Drawing Sheets

(56) References Cited

U.S. PATENT DOCUMENTS

| | | |
|---|---|---|
| 6,505,153 B1 | 1/2003 | Van et al. |
| 6,738,973 B1 * | 5/2004 | Rekimoto ............ G06F 3/04817 |
| | | 708/201 |
| 7,013,273 B2 | 3/2006 | Kahn |
| 8,804,035 B1 | 8/2014 | Casavant et al. |
| 8,924,216 B2 | 12/2014 | Neubacher et al. |
| 9,324,319 B2 * | 4/2016 | Yassa ...................... G10L 15/05 |
| 9,332,319 B2 | 5/2016 | Tsai et al. |
| 9,602,886 B2 | 3/2017 | Amidei et al. |
| 2001/0025241 A1 | 9/2001 | Lange et al. |
| 2001/0039659 A1 | 11/2001 | Simmons et al. |
| 2002/0010916 A1 | 1/2002 | Thong et al. |
| 2008/0049934 A1 | 2/2008 | Onoda et al. |
| 2009/0204404 A1 | 8/2009 | Jarman et al. |
| 2010/0293570 A1 | 11/2010 | Teraoka et al. |
| 2011/0134321 A1 | 6/2011 | Berry et al. |
| 2012/0078626 A1 | 3/2012 | Tsai et al. |
| 2013/0030805 A1 | 1/2013 | Suzuki et al. |
| 2013/0198005 A1 | 8/2013 | Xiong et al. |
| 2014/0337879 A1 | 11/2014 | Arling et al. |
| 2014/0351837 A1 | 11/2014 | Amidei et al. |

* cited by examiner

DATA PROCESSING METHOD AND LIVE BROADCASTING METHOD AND DEVICE

CROSS-REFERENCE TO RELATED APPLICATIONS

The present application is based on and claims priority to Chinese Application No. 201610639385.5, filed Aug. 5, 2016, the entire contents of which is incorporated herein by reference.

TECHNICAL FIELD

The present disclosure relates to the multimedia field, and in particular, to data processing methods, and live broadcasting methods and devices.

BACKGROUND ART

For the convenience of viewing, subtitles are often added to recorded programs, such as movies, TV series, and reality and entertainment shows. Typically, the subtitles are made and incorporated into the programs by professionals.

For live programs, such as news and sports games, there is no time to insert subtitles manually because of real time collection, transmission, and broadcasting. Moreover, it is impossible to predict what will happen during the programs, and therefore it is impossible to prepare matching subtitles in advance, either.

According to the prior art, therefore, it is impossible to add subtitles prepared for a live broadcasting program into the program.

When watching a program, moreover, a user needs to manually perform operations, such as sending barrages (also known as "bullet screen" or "danmu," where the bullets don't refer to actual bullets, but to text messages that audience members send via their devices such as computers or mobile phones while watching the film or video. The messages are then projected onto the screen, so that at any given time the scene may be overlaid with multiple "bullets," or comments, scrolling across the screen), sending red pocket money, etc., which can be inconvenient.

SUMMARY

Various embodiments of the present application provide a data processing method, a live broadcasting method and a device, which can insert, in real time, text information obtained from speech recognition according to audio data.

The present application may include the following embodiments.

In some embodiments, a data processing method may comprise: converting audio and video data into broadcast data in a predetermined format, and performing speech recognition on the audio data in the audio and video data; adding the text information obtained from speech recognition into the broadcast data.

Optionally, the performing speech recognition on the audio data in the audio and video data comprises: segmenting the audio data in the audio and video data, and performing speech recognition on the segmented audio data segment by segment.

Optionally, the segmenting the audio data in the audio and video data comprises: in the audio and video data, using parts with energy continuously lower than a predetermined threshold as intervals between different segments, and segmenting the audio data in the audio and video data according to the intervals; wherein energy being continuously lower than a predetermined threshold refers to that the length of time when energy is lower than the predetermined threshold reaches a predetermined time length.

Optionally, the adding the text information obtained from speech recognition into the broadcast data comprises: generating subtitles according to the text information obtained from speech recognition, and incorporating the generated subtitles, according to the time axis information, into the broadcast data.

Optionally, the converting audio and video data into broadcast data in a predetermined format comprises: encoding the audio and video data, and packaging the encoded audio and video data into a code stream of streaming media.

Optionally, the converting audio and video data into broadcast data in a predetermined format, and performing speech recognition on the audio data in the audio and video data comprises: converting audio and video data, frame by frame, into broadcast data in a predetermined format, and placing it into a first FIFO (first-in-first-out) queue; performing speech recognition on the audio data in the audio and video data, and placing the text information obtained from speech recognition into a second FIFO queue.

Optionally, the adding the text information obtained from speech recognition into the broadcast data comprises: extracting broadcast data from the first FIFO queue, and extracting corresponding text information from the second FIFO queue; adding the extracted text information into the extracted broadcast data; placing the broadcast data with the added text information into a third FIFO queue.

In some embodiments, a live broadcasting method may comprise: collecting audio and video data; converting the collected audio and video data into a code stream of streaming media, and performing speech recognition on the audio data in the audio and video data; adding the text information obtained from speech recognition into the code stream of streaming media; sending the code stream of streaming media with the added text information to a source site of a content delivery network.

In some embodiments, a data processing device may comprise: a processing module configured to convert audio and video data into broadcast data in a predetermined format, and perform speech recognition on the audio data in the audio and video data; an incorporating module configured to add the text information obtained from speech recognition into the broadcast data.

Optionally, the processing module comprises: a converting unit configured to convert audio and video data into broadcast data in a predetermined format; a speech recognition unit configured to perform speech recognition on the audio data in the audio and video data; a delivery unit configured to duplicate the audio data in the audio and video data, send the audio and video data to the converting unit, and send the duplicated audio data to the speech recognition unit.

Optionally, the performing speech recognition on the audio data in the audio data comprises: segmenting the audio data in the audio and video data, and performing speech recognition on the segmented audio data segment by segment.

Optionally, the segmenting the audio data in the audio and video data comprises: in the audio and video data, using parts with energy continuously lower than a predetermined threshold as intervals between different segments, and segmenting the audio data in the audio and video data according to the intervals; wherein energy being continuously lower than a predetermined threshold refers to that the length of time when energy is lower than the predetermined threshold reaches a predetermined time length.

Optionally, the incorporating module adding the text information obtained from speech recognition into the broadcast data comprises: generating subtitles according to the text information obtained from speech recognition, and incorporating the generated subtitles, according to the time axis information, into the broadcast data.

Optionally, the converting audio and video data into broadcast data in a predetermined format comprises: encoding the audio and video data, and packaging the encoded audio and video data into a code stream of streaming media.

In some embodiments, a data processing device may comprise a memory and a processor; the memory is configured to store a program for data processing; the program for data processing executes, when read and executed by the processor, the following operations: converting audio and video data into broadcast data in a predetermined format, and performing speech recognition on the audio data in the audio and video data; adding the text information obtained from speech recognition into the broadcast data.

In some embodiments, a data processing device may comprise: a collecting module configured to collect audio and video data; a processing module configured to convert the collected audio and video data into a code stream of streaming media, and concurrently, perform speech recognition on the audio data in the audio and video data; an incorporating module configured to add the text information obtained from speech recognition into the code stream of streaming media; a sending module configured to send the code stream of streaming media with the added text information to a source site of a content delivery network.

One aspect of the present application provides a data processing method and device, which can facilitate a user to perform operations when viewing a program.

The present application employs the following technical solutions.

In some embodiments, a data processing method may comprise: receiving broadcast data from a network device (e.g., a network-side apparatus) for broadcasting; collecting speech data during the broadcasting process; performing speech recognition on the collected speech data; sending the text information obtained from the speech recognition to the network device.

Optionally, the performing speech recognition on the collected speech data comprises: segmenting the collected speech data, and performing speech recognition on the segmented speech data segment by segment.

Optionally, the segmenting the collected speech data comprises: in the speech data, using parts with energy continuously lower than a predetermined threshold as intervals between different segments, and segmenting the collected speech data according to the intervals; wherein energy being continuously lower than a predetermined threshold refers to that the length of time when energy is lower than the predetermined threshold reaches a predetermined time length.

Optionally, the sending the text information obtained from the speech recognition to the network device comprises: when the text information obtained from the speech recognition comprises a preset keyword, converting the text information to a corresponding operation instruction according to a preset corresponding relationship between keywords and operation instructions; sending the operation instruction to the network device.

Optionally, the method further comprises: displaying the text information obtained from the speech recognition.

In some embodiments, a data processing device may comprise: a broadcasting module configured to receive broadcast data from a network device for broadcasting; a speech collecting module configured to collect speech data during the broadcasting process; a speech recognition module configured to perform speech recognition on the collected speech data; a transmission module configured to send the text information obtained from the speech recognition to the network device.

Optionally, the speech recognition module performing speech recognition on the collected speech data comprises: segmenting the collected speech data, and performing speech recognition on the segmented speech data segment by segment.

Optionally, the segmenting the collected speech data comprises: in the speech data, using parts with energy continuously lower than a predetermined threshold as intervals between different segments, and segmenting the collected speech data according to the intervals; wherein energy being continuously lower than a predetermined threshold refers to that the length of time when energy is lower than the predetermined threshold reaches a predetermined time length.

Optionally, the transmission module sending the text information obtained from the speech recognition to the network device comprises: when the text information obtained from the speech recognition comprises a preset keyword, converting the text information to a corresponding operation instruction according to a preset corresponding relationship between keywords and operation instructions; sending the operation instruction to the network device.

In some embodiments, a data processing device may comprise a memory and a processor; the memory is configured to store a program for data processing; the program for data processing executes, when read and executed by the processor, the following operations: receiving broadcast data from a network device for broadcasting; collecting speech data during the broadcasting process; performing speech recognition on the collected speech data; sending the text information obtained from the speech recognition to the network device.

The present application has the following advantages.

At least one embodiment of the present application can, during a process of processing audio and video data, perform speech recognition on audio data in the audio and video data, and carry the result of speech recognition in the processing result of the audio and video data, which are used together as the broadcast data; since speech recognition has been performed on audio data during the process of processing audio and video data, and since a speech recognition technique is used to automatically perform recognition, the text information obtained from the speech recognition can be added, in real time, during live broadcasting and other processes.

Another embodiment of the present application can, during the process of program broadcasting, allow a user to complete corresponding operations through speech, which improves the operating efficiency and makes operations simpler and easier.

In one implementation, the audio data can be segmented and then recognized segment by segment, which improves the real-time attribute; in addition, segmentation may be performed according to sentence pauses to further optimize the real-time attribute.

A product that implements the present application does not necessarily have to achieve the above advantages all at the same time.

DETAILED DESCRIPTION OF THE SPECIFIC EMBODIMENTS

Technical solutions of the present application will be described in greater detail below with reference to the accompanying drawings and embodiments.

Provided that no conflict is caused, the embodiments described herein and features in the embodiments may be combined with each other, and shall all be encompassed by the present application. In addition, logic sequences are shown in the flowcharts in the figures; in some cases, however, the illustrated or described steps may be executed in a sequence that is different from those described herein.

In a typical configuration, the terminal or data processing device for implementing the embodiments of the present application may include one or more processors (e.g., CPUs), I/O interfaces, network interfaces, and memories.

The memory may include non-transitory computer readable media, such as a volatile memory, a Random Access Memory (RAM), and/or a non-volatile memory, e.g. a Read-Only Memory (ROM) or a flash RAM. The memory is an example of a computer readable medium, and the memory may include module 1, module 2, ..., module N (N being an integer greater than 2).

The computer readable media may include permanent and volatile, mobile and immobile media, which can implement information storage through any method or technology. The information may comprise computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible by a computation device. The computer readable media does not include transitory media, such as modulated data signals and carriers.

Figure 1:
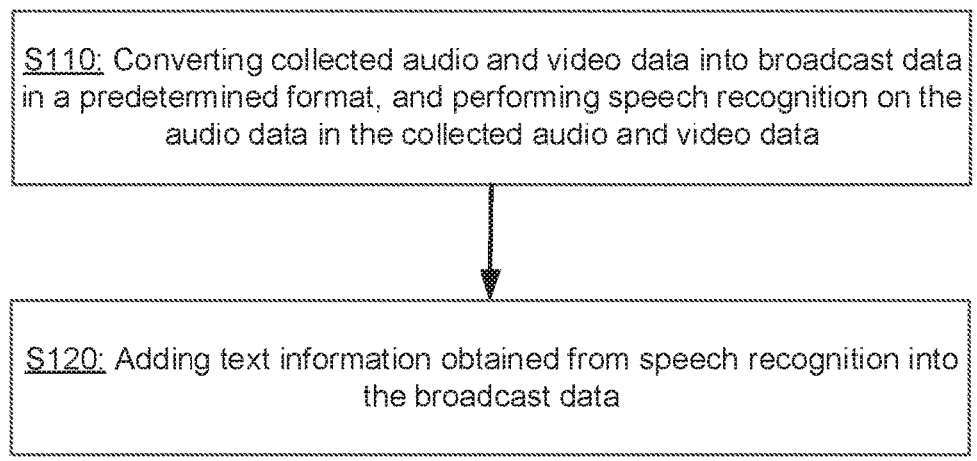
FIG. 1 is a flowchart of a data processing method, consistent with the exemplary embodiments of the present disclosure.

In some embodiments, a data processing method, as shown in FIG. 1, may comprise Steps S110-S120:

S110. converting collected audio and video data into broadcast data in a predetermined format (e.g., data in a format ready for broadcast), and performing speech recognition on the audio data in the collected audio and video data;

S120. adding text information obtained from speech recognition into the broadcast data.

In the step S110, the collected audio and video data can be converted into broadcast data in a predetermined format, which facilitates the transmission and broadcasting of the audio and video data. Speech recognition can be performed on the audio data in the collected audio and video data to identify corresponding text information based on the speech data comprised in the audio data.

In the step S120, the text information obtained from speech recognition can be added into the broadcast data, such that a user can view the text information that matches the audio data in the broadcast data, while watching the broadcast data by using an APP or webpage.

When the data processing method is applied in live broadcasting, corresponding text information can be generated directly according to the collected audio data after the collection, and added together with the processed audio and video data into the broadcast data. In such way, users can see the text information generated according to the actual speech while watching the live broadcasting.

In one implementation mode, the conversion and speech recognition in the step S110 may be a concurrent process, namely, during a process of processing audio and video data, speech recognition can be performed concurrently on audio data in the audio and video data. Since recognition can be performed concurrently on the audio data, and since a speech recognition technique is used to automatically perform recognition, the step can be carried out in real time.

In some other implementation modes, it is possible that the conversion and speech recognition in the step S110 are carried out in sequence. For example, speech recognition is performed first on audio data in the collected audio and video data, and then the collected audio and video data is converted. For another example, the collected audio and video data is converted first, and then speech recognition is performed on the audio data extracted from the collected audio and video data.

Figure 2A:
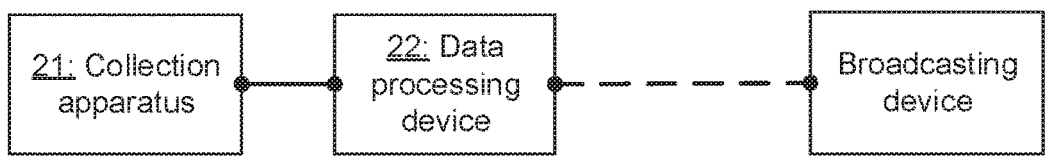
FIG. 2A is a schematic diagram of a system architecture, consistent with the exemplary embodiments of the present disclosure.
Figure 2B:
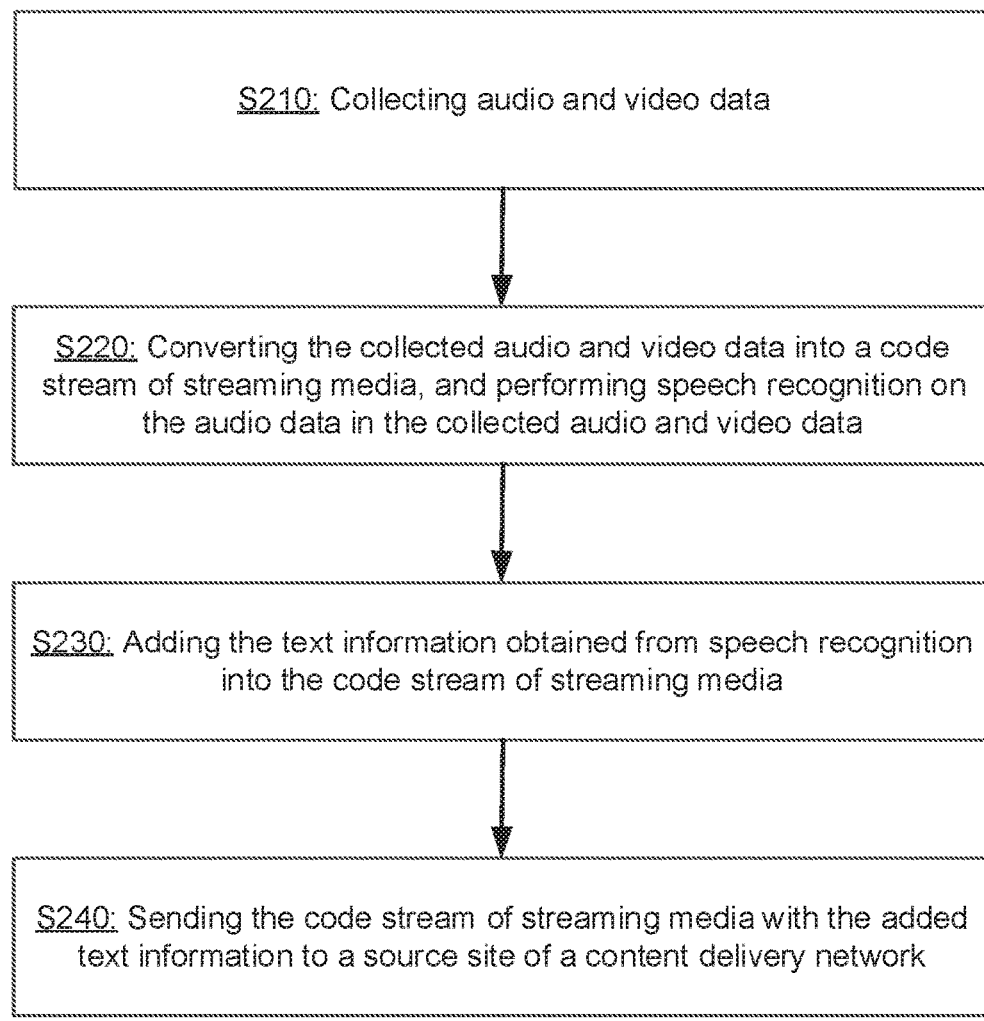
FIG. 2B is a flowchart of a live broadcasting method, consistent with the exemplary embodiments of the present disclosure.

A system architecture that implements the data processing method is shown in FIG. 2A, which comprises a collection apparatus 21 and a data processing device 22.

The collection apparatus 21 may be used to collect audio and video signals, obtain audio and video data after performing noise reduction and other processing, send the audio and video data to the data processing device 22, or cache the audio and video data for the data processing device 22 to extract. The audio and video data obtained by the collection apparatus 21 may be in a format of data frame or data packet. When the collection apparatus 21 actively sends audio and video data to the data processing device 22, it may send each frame or each data packet immediately upon obtaining the frame or data, or may obtain a plurality of frames or a plurality of data packets and send them together, or may send the audio and video data periodically. A similar process can be implemented for the data processing device 22 to obtain data from the collection apparatus 21. Throughout the entire collection process, audio and video data may reach the data processing device 22 in a steady flow, regardless of the mode employed.

The collection apparatus 21 may comprise a professional camera, a regular camera connected with an external microphone, or a terminal such as cell phone, tablet computer, laptop computer, and the like. The audio and video data collected by the collection apparatus 21 may be integrated, e.g., the audio and video data are packaged (e.g., combined) together, and the audio data is at a preset position of the packaged data. The audio and video data collected by the collection apparatus 21 may also be independent from each other, and correspond to each other via time information carried by them respectively.

The data processing device 22 may be used to execute the above steps S110-S120. In some embodiments, after obtaining the audio and video data from the collection apparatus 21, the data processing device 22 can perform at least two processing methods if conversion and speech recognition are performed concurrently:

One processing method is duplicating only the audio data of the collected audio and video data, and then performing the following processing concurrently: converting the collected audio and video data into broadcast data in a predetermined format; and performing speech recognition on the duplicated audio data.

The other processing method is duplicating the collected audio and video data by at least two sets (e.g., when one copy of the audio and video data is duplicated, there are two sets of the audio and video data, the originally collected and the duplicated), and then performing the following processing concurrently: converting one set of the duplicated audio and video data into broadcast data in a predetermined format; extracting audio data from another set of the duplicated audio and video data and performing speech recognition on the extracted audio data.

In this example, performing the processing concurrently means that the two processes, "conversion" and "speech recognition", are being performed simultaneously during the same time period, and are substantially synchronous. It is not necessary to perform speech recognition until conversion is completed, nor is it necessary to start conversion only after speech recognition is completed. Thus, the processing speed is accelerated.

In the case where conversion and speech recognition are not performed concurrently, at least one copy of the audio and video data or the audio data can be duplicated, such that conversion and speech recognition are performed on different audio and video data (the original or the duplicated copy of the audio and video data), respectively.

During the collection process, the data processing device 22 will obtain audio and video data in a steady flow, and therefore, the operations of conversion, speech recognition, and addition of the text information into the broadcast data can be carried out continuously. The broadcast data with the addition of the text information can be generated continuously, and can be sent while being generated, or can be cached until an amount is reached for sending, or can be sent periodically.

After adding the text information obtained from speech recognition into the broadcast data, the data processing device 22 may send the broadcast data with addition of the text information to an apparatus for providing broadcasting sources, such as a source site of a content delivery network (CDN), or upload the broadcast data to a satellite, and then a broadcasting apparatus acquires the broadcast data for broadcasting from the apparatus providing broadcasting sources. The data processing device 22 itself may also directly broadcast the broadcast data with the addition of the text information, or may send the broadcast data with the addition of the text information directly to a broadcasting apparatus.

There may be one or more broadcasting apparatuses, which can obtain, directly or indirectly from an apparatus providing broadcasting sources, the broadcast data with the addition of the text information supplied by the data processing device 22, or may be directly connected to the data processing device 22 for direct reception of the broadcast data with addition of the text information sent by the data processing device 22 or extracted from the data processing device 22.

Depending on paths and manners through which the broadcast data is transmitted to a user, the data processing device 22 may employ different conversion modes. For example, when the broadcast data is broadcast in a stream manner, the data processing device 22 may encode and package the collected audio and video data into a code stream of streaming media. When the broadcast data is broadcast by satellite TV, the data processing device 22 may modulate the collected audio and video data to obtain satellite TV signals.

The collection apparatus 21 and the data processing device 22 may be different apparatuses that are independent from each other, or may be the same apparatus.

Parts of the data processing device 22 for implementing different functions may be disposed within one apparatus, or may be distributed over different apparatuses.

In one implementation mode, the performing speech recognition on the audio data in the collected audio and video data may comprise: segmenting the audio data in the collected audio and video data, and performing speech recognition on the segmented audio data segment by segment.

Since conversion is performed with data frame or data packet as conversion unit when the audio and video data is converted, segmentation can reduce the unit of speech recognition (e.g., unit size) and enable it to be more synchronous with the conversion operation.

The segmenting the audio data in the collected audio and video data may comprise: in the collected audio and video data, using parts with energy continuously lower than a predetermined threshold as intervals between different segments, and segmenting the audio data in the collected audio and video data according to the intervals. In this disclosure, the "energy" may comprise any type of energy measurement or associated parameter, such as amplitude, power, etc. Thus, comparing an energy with a threshold may comprise comparing a power with a corresponding threshold.

The energy being continuously lower than the predetermined threshold refers to when a length of time when energy is lower than the predetermined threshold reaches a predetermined time length. That is, the segmenting the audio data in the collected audio and video data may comprise segmenting the audio data in the audio and video data at one or more intervals with energy continuously lower than a predetermined threshold for over a predetermined time length.

The energy level of audio data represents the sound level of the collected audio data. If the energy is continuously lower than a predetermined threshold, it means that there is a pause of sound. For example, when audio data is being collected from a speech by a user, the energy will be continuously lower than a predetermined threshold at pauses between one sentence and the next sentence spoken by the user. When the audio data mainly comprises speech data, the predetermined time length may be determined according to the statistics of average time length of pauses in speeches by regular people, which may include, but is not limited to, 200 ms. The predetermined time length may be adjusted correspondingly when the collection is performed in various scenarios and on various objects.

In one example, the segmenting the audio data in the collected audio and video data may comprise: detecting energy of the audio data in the collected audio and video data; when a segment of audio data is detected that its energy is lower than a predetermined threshold and the duration reaches a predetermined time length, segmenting at the start point (or end point, or a middle time point) of the segment of audio data, and performing speech recognition on the segmented audio data. For example, assuming that the predetermined time length is 200 ms, energy from the start point (assumed to be 0 s) of audio data is measured. Assuming that the energy begins to be lower than a predetermined threshold at 1 s, which lasts 200 ms (i.e., the energy is higher than the predetermined threshold from 0 s to 1 s, and lower than the predetermined threshold from 1 s to 1.2 s), segmentation can be performed at this moment, for example, to segment the audio data from 0 s to 1 s as one segment, perform speech recognition on this segment, and at the same time, continue the detection of energy of the audio data after 1.2 s. Another segment of the audio data can be similarly obtained when it is detected that the energy is continuously lower than the predetermined threshold.

Compared to segmentation and recognition of speech data at fixed time lengths, the disclosed segmentation without a fixed time length has a better overall real-time attribute.

In one implementation mode, the adding the text information obtained from speech recognition into the broadcast data may comprise:

generating subtitles according to the text information obtained from speech recognition, and incorporating the generated subtitles, according to the time axis information, into the broadcast data.

In some embodiments, the collected audio and video data carries time axis information, and after text information is identified based on the audio data, the text information also carries the time axis information of the audio data. The subtitles generated according to the text information also carry the time axis information of corresponding audio data. The converted broadcast data carries the time axis information of corresponding audio and video data. Through the correspondence of time axis information, the subtitles can be added to proper positions in the broadcast data, thereby achieving real-time addition of subtitles.

The form of the subtitles may include, but is not limited to, texts displayed on a green screen. Adding subtitles into broadcast data can be treated as superimposing the subtitles and images in the video.

In one implementation mode, the converting collected audio and video data into broadcast data in a predetermined format may comprise: encoding the collected audio and video data, and packaging the encoded audio and video data into a code stream of streaming media.

The streaming media refer to a medium format that is broadcast on the Internet in a manner of streaming transmission. Streaming media is also called stream-type media, which means that programs are sent as data packets and transmitted to a network. A user decompresses these data through a decompression apparatus, and then the program will be displayed as prior to the transmission.

The broadcast data with addition of the text information will maintain the format of a code stream of streaming media.

In one implementation mode, the converting collected audio and video data into broadcast data in a predetermined format, and performing speech recognition on the audio data in the collected audio and video data may comprise: converting collected audio and video data, frame by frame, into broadcast data in a predetermined format, and placing it into a first FIFO (first-in-first-out) queue; and performing speech recognition on the audio data in the collected audio and video data, and placing the text information obtained from speech recognition into a second FIFO queue.

During live broadcasting and other processes, the collected audio and video data can be generated in a steady flow, and correspondingly, conversion and speech recognition can be also a continuing process, e.g., conversion/speech recognition can be performed continuously on newly collected audio and video data to continuously generate broadcast data.

The adding the text information obtained from speech recognition into the broadcast data may comprise: extracting broadcast data from the first FIFO queue, and extracting corresponding text information from the second FIFO queue; adding the extracted text information into the extracted broadcast data; and placing the broadcast data with the added text information into a third FIFO queue.

Similarly, adding the text information obtained from speech recognition into the broadcast data can also be a continuing process. After the broadcast data with the added text information is placed into a third FIFO queue, if there are still the broadcast data and the text information left in the first/second FIFO queues, the operation of adding the text information obtained from speech recognition into the broadcast data can be continued.

Similarly, the collected audio and video data may also be placed into a FIFO queue to wait for conversion and speech recognition. The broadcast data with addition of the text information may also be placed into a FIFO queue to wait for sending or broadcasting.

The FIFO queue above may also be treated as a storage area in a cache.

In some embodiments, a live broadcasting method may comprise Steps S210-S240:

S210. collecting audio and video data;

S220. converting the collected audio and video data into a code stream of streaming media, and performing speech recognition on the audio data in the collected audio and video data;

S230. adding the text information obtained from speech recognition into the code stream of streaming media;

S240. sending the code stream of streaming media with the added text information to a source site of a content delivery network.

The live broadcasting method may be applied in the system architecture shown in FIG. 2A, wherein the embodiments described above can be referenced for details to implement the steps S220 and S230.

Figure 3:
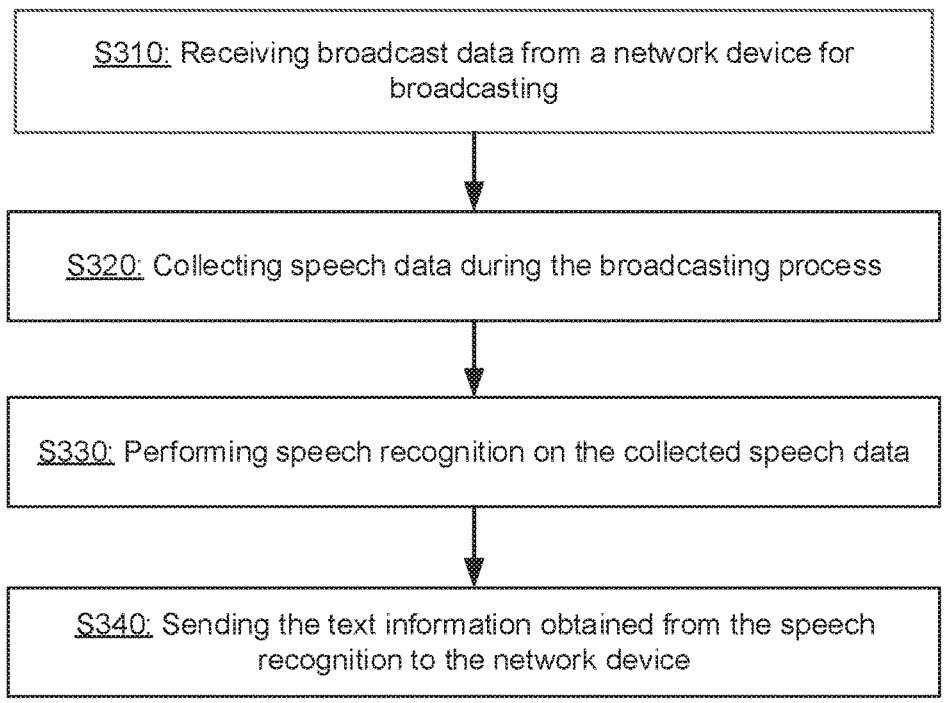
FIG. 3 is a flowchart of a data processing method, consistent with the exemplary embodiments of the present disclosure.

In some embodiments, a data processing method, as shown in FIG. 3, may comprise Steps S310-S340:

S310. receiving broadcast data from a network device for broadcasting;

S320. collecting speech data during the broadcasting process;

S330. performing speech recognition on the collected speech data; and

S340. sending the text information obtained from the speech recognition to the network device.

As such, during the process of program broadcasting, a user can complete corresponding operations through speech, which improves the operating efficiency and makes operations simpler and easier.

The data processing method with reference to FIG. 3 may be implemented by, but is not limited to, an APP (e.g., application) on a terminal. The APP itself has the function of requesting programs from a network device and broadcasting the programs. During broadcasting, the APP can simultaneously collect speeches by a user in real time, obtain text information based on the speeches, and send the text information back to the source site of the broadcast programs.

In one embodiment, the text information may comprise comments, such as barrages (also known as "bullet screen" or "danmu," where the bullets don't refer to actual bullets, but to text messages that audience members send via their devices such as computers or mobile phones while watching the film or video. The messages are then projected onto the screen, so that at any given time the scene may be overlaid with multiple "bullets," or comments, scrolling across the screen), sent by users regarding a program that they are watching via an APP or a webpage. After the text information is sent back to the network device, the network device can distribute the text information via an apparatus like a message distribution server, or add the text information into the broadcast data corresponding to the program being watched by the user, thereby displaying the text information at a plurality of terminals on which the program is being watched, and the plurality of terminals may also include the terminal that sends the text information.

In one embodiment, the text information may also represent an operation performed by a user on a program being broadcast in a terminal. In one implementation mode, the sending the text information obtained from the speech recognition to the network device may comprise: when the text information obtained from the speech recognition comprises a preset keyword, converting the text information to a corresponding operation instruction according to a preset corresponding relationship between keywords and operation instructions; and sending the operation instruction to the network device.

In the implementation mode, a relationship between keywords and operation instructions needs to be pre-stored locally. The network device can recognize operation instructions, and the operation instructions can trigger the network device to execute corresponding actions.

The implementation mode allows users to send red pocket money/gifts with respect to a program being broadcast, or perform operations like changing live broadcasting rooms. Messages related to these operations can also be displayed in a plurality of terminals on which the program is being watched, and the plurality of terminals may also include the terminal that sends the text information.

In some other implementation modes, a relationship between keywords and operation instructions may be stored on a network device. When the received text information comprises a preset keyword, a corresponding operation instruction can be executed. When the received text information does not comprise a preset keyword, the text information is displayed.

In one embodiment, to prevent speeches by a user from being sent mistakenly (e.g., when a user converses normally, instead of commenting or operating on a program), the step S320 may comprise: during the broadcasting process, collecting speech data when a predetermined operation is detected.

For example, collection is performed only when a user presses or long presses a button (an actual or virtual button) or a button combination. For another example, collection is performed only when a user inputs a corresponding instruction or selects a corresponding option.

Moreover, different buttons/button combinations/instructions/options may be used to represent sending comments and sending instructions, respectively. For example, when a user presses a button A, the speech by the user represents comments, and the text information obtained from recognition is sent directly to a network device. When a user presses a button B, the speech by the user represents instructions, and the instructions need to be converted to corresponding operation instructions and then sent to a network device.

In one implementation mode, the performing speech recognition on the collected speech data may comprise: segmenting the collected speech data, and performing speech recognition on the segmented speech data segment by segment.

The segmenting the collected speech data may comprise: in the collected speech data, using parts with energy continuously lower than a predetermined threshold as intervals between different segments, and segmenting the collected speech data according to the intervals.

The energy being continuously lower than a predetermined threshold may refer to that the length of time when energy is lower than the predetermined threshold reaches a predetermined time length. That is, the segmenting the collected speech data may comprise segmenting the collected speech data at one or more intervals with energy continuously lower than a predetermined threshold for over a predetermined time length.

The description of details to implement segmentation of the audio data described above can be referenced for details to implement segmentation of the speech data.

In one implementation mode, the method may further comprise:

displaying the text information obtained from the speech recognition.

Figure 4:
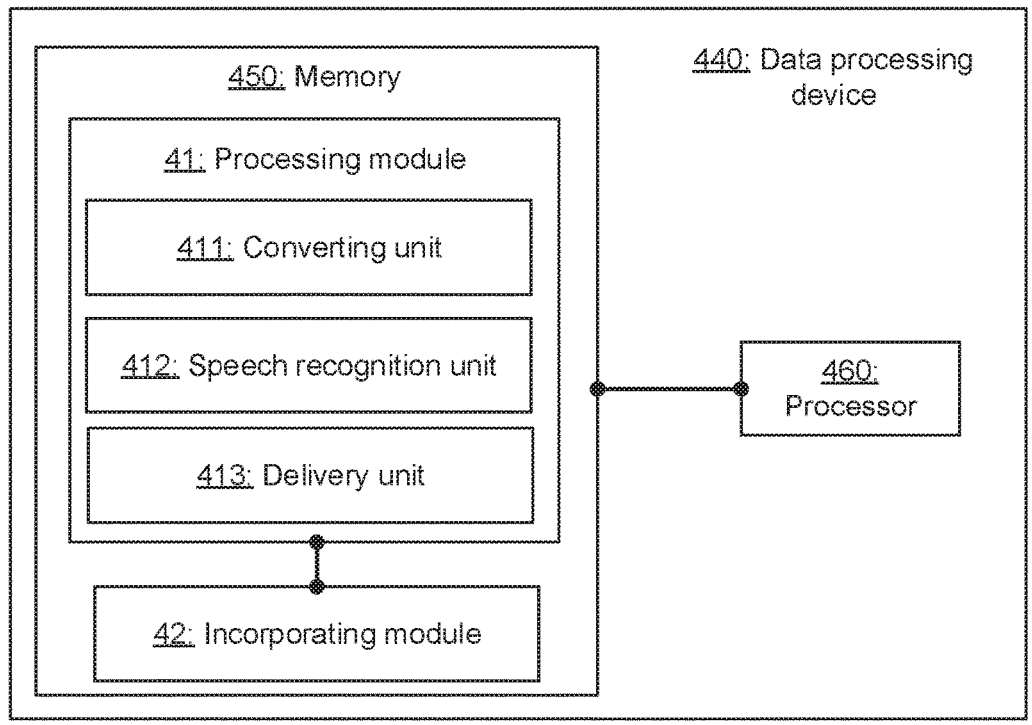
FIG. 4 is a schematic diagram of a data processing device, consistent with the exemplary embodiments of the present disclosure.

In some embodiments, a data processing device 440, as shown in FIG. 4, may comprise a memory 450 (e.g., a non-transitory computer-readable memory) and a processor 460. The memory 450 may be configured to store a program (e.g., instructions) for data processing. The program may be embodied as various modules described below. The program, when read and executed by the processor, may cause the device to perform various methods and steps described below with respect to various modules and units. The memory 450 may comprise a processing module 41 configured to convert collected audio and video data into broadcast data in a predetermined format, and perform speech recognition on the audio data in the collected audio and video data; and an incorporating module 42 configured to add the text information obtained from speech recognition into the broadcast data.

In one implementation mode, the processing module may comprise: a converting unit 411 configured to convert collected audio and video data into broadcast data in a predetermined format; a speech recognition unit 412 configured to perform speech recognition on the audio data in the collected audio and video data; and a delivery unit 413 configured to duplicate the audio data in the collected audio and video data, send the collected audio and video data to the converting unit, and send the duplicated audio data to the speech recognition unit.

In one implementation mode, the processing module may comprise the above converting unit and speech recognition unit, and further comprise a delivery unit and an extraction unit; the delivery unit is configured to duplicate at least one copy of the collected audio and video data, send one copy of the audio and video data (originally collected or duplicated) to the converting unit, and send the other copy of the audio and video data to the extraction unit; the extraction unit extracts the audio data and sends the audio data to the speech recognition unit.

In one implementation mode, the performing speech recognition on the audio data in the collected audio data may comprise: segmenting the audio data in the collected audio and video data, and performing speech recognition on the segmented audio data segment by segment.

The segmenting the audio data in the collected audio and video data may comprise: in the collected audio and video data, using parts with energy continuously lower than a predetermined threshold as intervals between different segments, and segmenting the audio data in the collected audio and video data according to the intervals.

The energy being continuously lower than a predetermined threshold may refer to that the length of time when energy is lower than the predetermined threshold reaches a predetermined time length.

In one implementation mode, the incorporating module adding the text information obtained from speech recognition into the broadcast data may comprise: generating subtitles according to the text information obtained from speech recognition, and incorporating the generated subtitles, according to the time axis information, into the broadcast data.

In one implementation mode, the converting collected audio and video data into broadcast data in a predetermined format may comprise: encoding the collected audio and video data, and packaging the encoded audio and video data into a code stream of streaming media.

Operations of the modules in the device described above may correspond to the steps of the method of embodiments described above with reference to FIG. 1 and FIG. 2A, which can be referenced for details of the operations of these modules.

In some embodiments, a data processing device may comprise a memory and a processor; the memory is configured to store a program for data processing; and the program for data processing executes, when read and executed by the processor, the following operations: converting collected audio and video data into broadcast data in a predetermined format, and performing speech recognition on the audio data in the collected audio and video data; and adding the text information obtained from speech recognition into the broadcast data.

When the program for data processing in the data processing device is read and executed, the executed operations correspond to the steps of the method of embodiments described above with reference to FIG. 1 and FIG. 2A, which can be referenced for other operation details.

In some embodiments, a data processing device may comprise a memory (e.g., a non-transitory computer-readable memory) and a processor. The memory may be configured to store a program (e.g., instructions) for data processing. The program may be embodied as various modules described below. The program, when read and executed by the processor, may cause the device to perform various methods and steps described below with respect to various modules. The memory may comprise: a collecting module configured to collect audio and video data; a processing module configured to convert the collected audio and video data into a code stream of streaming media, and perform speech recognition on the audio data in the collected audio and video data; an incorporating module configured to add the text information obtained from speech recognition into the code stream of streaming media; and a sending module configured to send the code stream of streaming media with the added text information to a source site of a content delivery network.

The data processing device may comprise a cell phone, a tablet computer, a laptop computer, and the like.

The sending module in the data processing device may be a network card or other entities with communication capabilities. The collecting module may couple to microphones and cameras and configured to control the microphones to capture audio and control the cameras to capture video.

Operations of the processing module and the incorporating module may correspond to the steps of the method of embodiments described above with reference to FIG. 1 and FIG. 2A, which or implementation details of the processing module and the incorporating module in described above with reference to FIG. 4 can be referenced for details of the operations of these modules.

Figure 5:
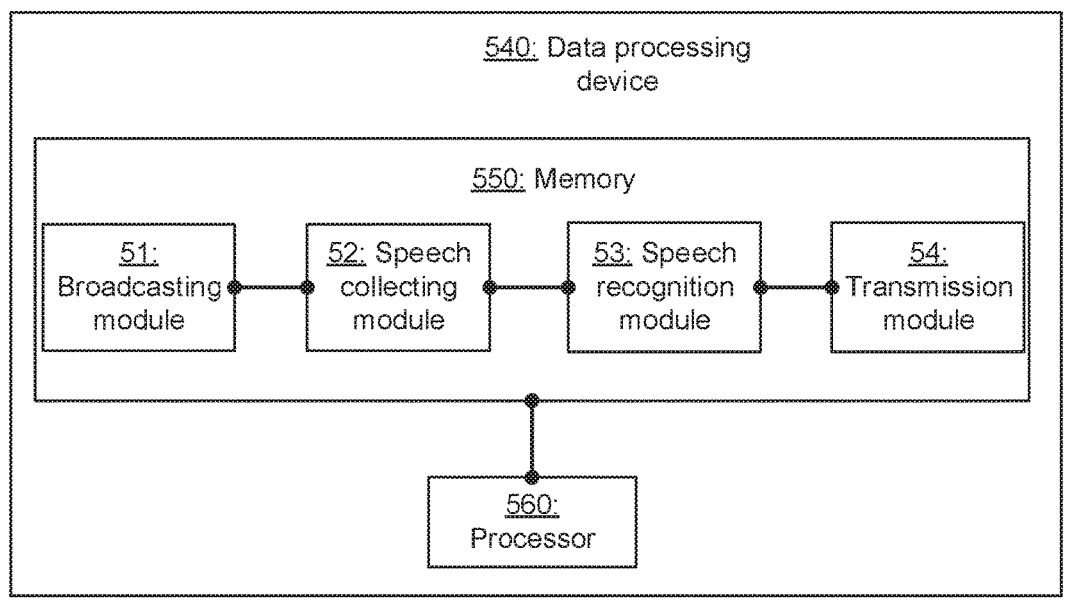
FIG. 5 is a schematic diagram of a data processing device, consistent with the exemplary embodiments of the present disclosure.

In some embodiments, a data processing device 540, as shown in FIG. 5, may comprise a memory 550 (e.g., a non-transitory computer-readable memory) and a processor 560. The memory 550 may be configured to store a program (e.g., instructions) for data processing. The program may be embodied as various modules described below. The program, when read and executed by the processor, may cause the device to perform various methods and steps described below with respect to various modules. The memory 550 may comprise: a broadcasting module 51 configured to receive broadcast data from a network device for broadcasting; a speech collecting module 52 configured to collect speech data during the broadcasting process; a speech recognition module 53 configured to perform speech recognition on the collected speech data; and a transmission module 54 configured to send the text information obtained from the speech recognition to the network device.

In one implementation mode, the speech recognition module performing speech recognition on the collected speech data may comprise:

segmenting the collected speech data, and performing speech recognition on the segmented speech data segment by segment.

The segmenting the collected speech data may comprise: in the collected speech data, using parts with energy continuously lower than a predetermined threshold as intervals between different segments, and segmenting the collected speech data according to the intervals.

The energy being continuously lower than a predetermined threshold refers to that the length of time when energy is lower than the predetermined threshold reaches a predetermined time length.

In one implementation mode, the transmission module sending the text information obtained from the speech recognition to the network device may comprise: when the text information obtained from the speech recognition comprises a preset keyword, converting the text information to a corresponding operation instruction according to a preset corresponding relationship between keywords and operation instructions; and sending the operation instruction to the network device.

The data processing device may comprise a cell phone, a tablet computer, a laptop computer, and the like.

The transmission module in the data processing device may comprise a network card or other entities with communication capabilities; the speech collecting module may comprise microphones and the like.

Operations of the modules in the data processing device may correspond to the steps of the method of described above with reference to FIG. 3, which can be referenced for details of the operations of these modules.

In some embodiments, a data processing device may comprise a memory and a processor. The memory is configured to store a program for data processing, and the program for data processing executes, when read and executed by the processor, causes the data processing device to perform the following operations: receiving broadcast data from a network device for broadcasting; collecting speech data during the broadcasting process; performing speech recognition on the collected speech data; and sending the text information obtained from the speech recognition to the network device.

When the program for data processing in the data processing device is read and executed, the executed operations correspond to the steps of the method described above with reference to FIG. 3, which can be referenced for other operation details.

Figure 6:
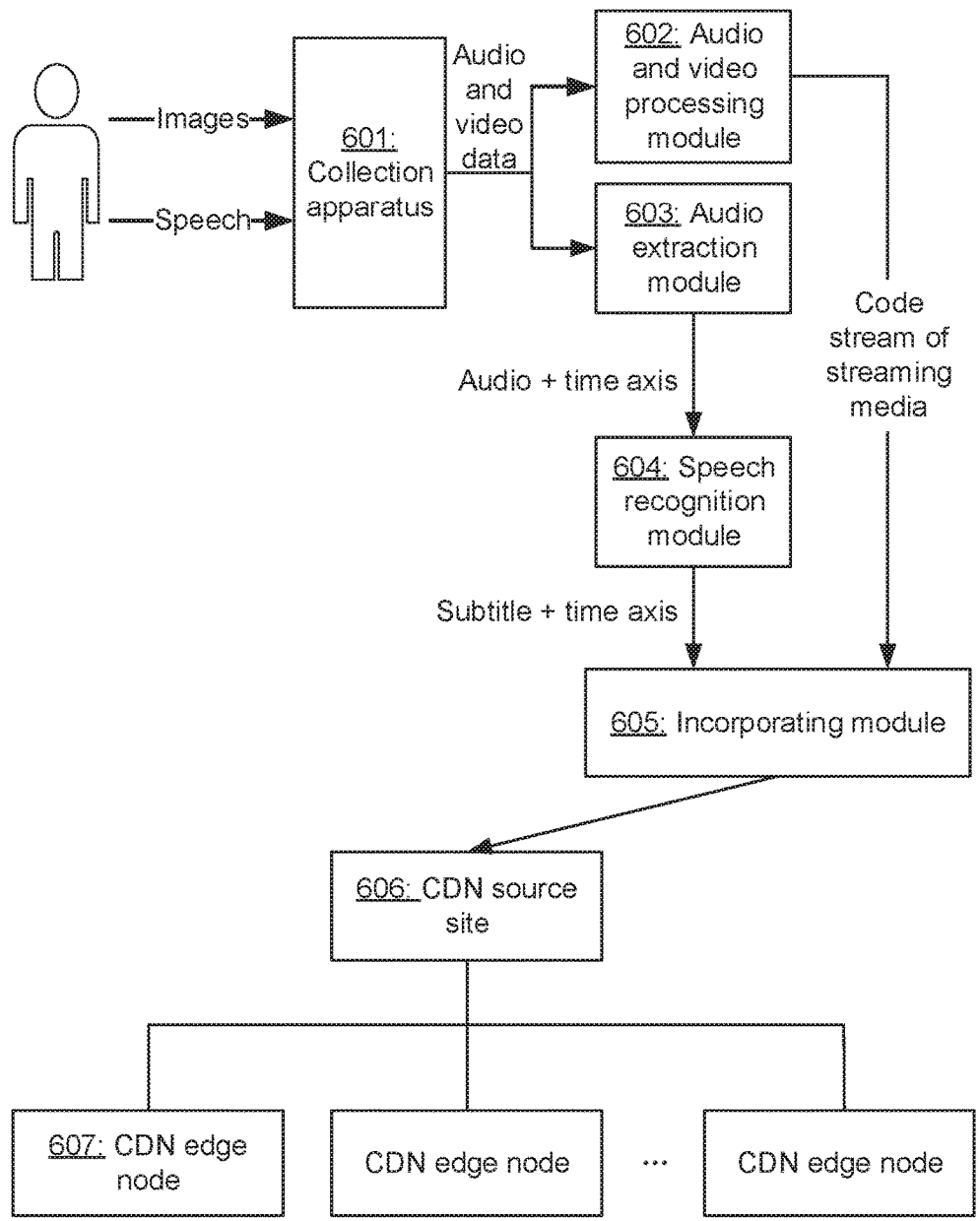
FIG. 6 is a schematic diagram of a live broadcasting system, consistent with the exemplary embodiments of the present disclosure.

In some embodiments, a live broadcasting system, as shown in FIG. 6, may comprise: a collection apparatus 601, which may comprise a professional camera, a regular camera and microphone, a cell phone, and the like. It can be configured to collect images and speeches from a user to form audio and video data.

The live broadcasting system may further comprise an audio and video processing module 602 configured to convert audio and video data into a transmission code stream that is convenient for network transmission and convenient for being watched on various apparatuses, such as, but not limited to, a code stream of streaming media.

The live broadcasting system may further comprise an audio extraction module 603 configured to separately duplicate one copy of the audio track portion of an audio and video stream to obtain duplicated audio data and time axis information.

The live broadcasting system may further comprise a speech recognition module 604 configured to segment the duplicated audio data into small segments, perform speech recognition on the data segment by segment to obtain text information, and generate subtitles according to the text information.

The live broadcasting system may further comprise a video subtitle incorporating module 605 configured to make the transmission code stream correspond to the text from speech recognition according to the time axis, superimpose them into a code stream of audio and video streaming media, and send the code stream.

The live broadcasting system may further comprise a CDN source site 606 configured to receive and store the code stream of audio and video streaming media from the superimposition processing.

When a user wants to watch a program, a request may be sent to a CDN edge node (e.g., CDN edge node 607) through an APP in a terminal. The CDN edge node 607 obtains a code stream of audio and video streaming media of the corresponding program from the CDN source site 606, and returns the same to the APP that sends the request.

Figure 7:
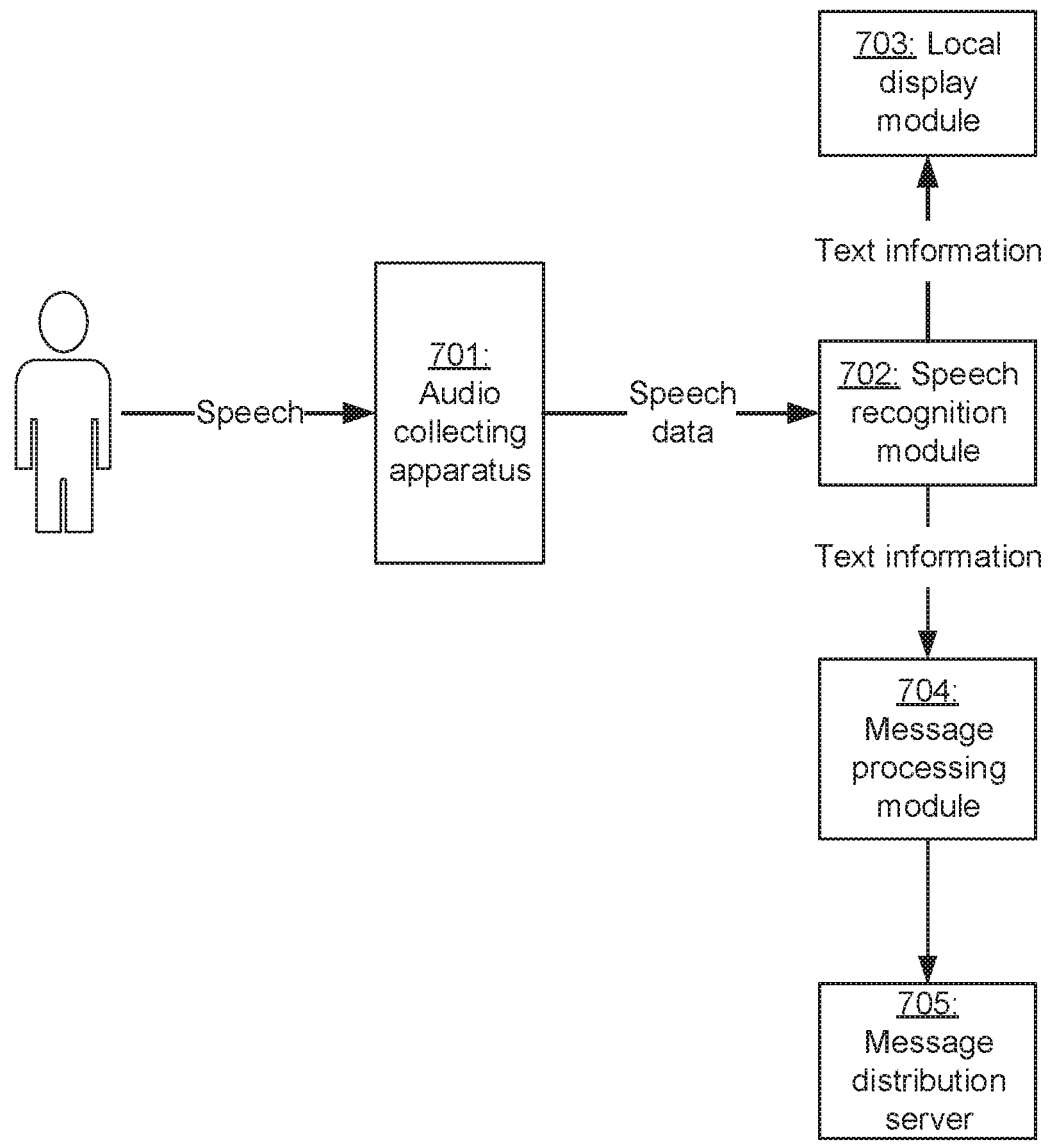
FIG. 7 is a schematic diagram of an end-user speech input system, consistent with the exemplary embodiments of the present disclosure.

In some embodiments, an end-user speech input system, as shown in FIG. 7, may comprise: an audio collecting module 701, comprising, for example, a professional audio collecting apparatus or a microphone apparatus on a PC or cellphone, and configured to collect speech data from a user.

The end-user speech input system may further comprise a speech recognition module 702 configured to segment the collected speech data into small segments, and perform speech recognition on the data segment by segment to obtain texts.

The end-user speech input system may further comprise a local display module 703 configured to upload the text information recognized by the speech recognition module to an APP of a terminal for display.

The end-user speech input system may further comprise a message processing module 704 and a message distribution server 705 configured to distribute the text information recognized by the user to APPs of terminals of other users for display.

In some embodiments, a live broadcasting method may comprise: using a collection apparatus, such as a professional camera, to collect images and speeches from a speaker, and transmitting the obtained audio and video data to a processing apparatus; the processing apparatus processes the collected audio and video data according to the steps S110 and S120 described above to obtain broadcast data added with the text information from speech recognition. The text information may be incorporated into the video data by adding a layer, such that a user can see the text information when watching the video. The text information may be made into a subtitle file and then incorporated into the video data, such that a user can see subtitles matching a live program when watching the program.

During a collection process, audio and video data is continuously collected, and correspondingly, broadcast data is continuously generated and continuously sent to a live broadcasting satellite, a CDN source site, or other positions, to be supplied to users as a live program.

A user who selects the live program can continuously receive and demodulate the broadcast data through a satellite TV, and then watch in real time the collected audio and video data with addition of corresponding text information. Alternatively, a user can request the live program from a CDN edge node through an APP on a terminal, a webpage browser, and the like. After being unpacked and decoded by the terminal, the live program is broadcast to the user.

The relationship between the collection apparatus and the processing apparatus may include, but is not limited to, one-to-one or multiple-to-one.

When connected to a plurality of collection apparatuses, the processing apparatus may perform processing in the steps S110 and S120 on the audio and video data collected by the plurality of collection apparatuses, respectively, to obtain a plurality of broadcast data, which may be sent, in whole or in part, as live programs. Alternatively, the audio and video data collected by the plurality of collection apparatuses may be pre-processed in the processing apparatus first, for example, the processing apparatus selects, according to preset rules or manually, audio and video to be broadcast as collected audio and video data for processing in the steps S110 and S120. For example, assuming that there are three professional cameras, only the audio and video data collected by one of the three can be selected within a time period for producing broadcast data that is presented to users.

The live broadcasting method may be applied in scenarios, such as releases, speeches, debates, conferences and sports broadcasting. Descriptions above with reference to FIG. 1 and FIG. 2A can be referenced for implementation details of processing the collected audio and video data into broadcast data.

In some embodiments, a live broadcasting method may comprise: after turning on a live broadcasting APP on a terminal, using camera and microphone on the terminal, by a user planning to broadcast live, to collect his/her own images and speeches, respectively, to obtain audio and video data. The live broadcasting APP or another APP in the terminal, upon request, can perform processing in the steps S110 and S120 on the collected audio and video data to obtain broadcast data. The live broadcasting APP sends the broadcast data, as a live program, to a corresponding server, and the broadcast images viewed by users who watch the live program from the server will display the text information that matches the audio data of the live program.

Descriptions above with reference to FIG. 1 and FIG. 2A can be referenced for implementation details of processing the collected audio and video data into broadcast data.

In some embodiments, a method for watching programs may comprise: using an APP on a terminal, by a user, to select, from programs provided by a server, a live broadcasting program to watch, or to select an existing program to watch. After selecting a program A, the user will receive broadcast data corresponding to the program A from the server. The APP on the terminal will, or other software will be called to, broadcast the broadcast data.

During the broadcasting process, the APP further collects speech data from the user; the APP can start collection as soon as the broadcasting begins, or start to collect speech data only when the user performs a specific operation (e.g., pressing a predetermined button or button combination).

When speech data is collected, the APP performs speech recognition to obtain text information and send the same to the server; the server performs at least one of the following processing on the text information: adding the text information into the program A watched by the user, wherein the text information may be added in a manner including, but not limited to, adding a layer into the video data of the program A; and executing an operation corresponding to the text information.

When the text information is added into the program A, all users watching the program A will see the text information during the broadcasting of the program. If the program A is a live broadcasting program, the text information may appear in the subsequent live broadcasting process, which can be viewed by all other users. The text information may also be stored together with the program A. If the program A is a program on demand, the text information can be stored together with the program A. When a user selects to watch a program on demand, he/she will also see the text information stored together with the program on demand.

When an operation corresponding to the text information is executed, the operation message can be displayed to all users who are watching the program A, or can be displayed only to the user who has executed the operation, for example "XX user sends red pocket money", etc.

When watching the program, the user may also select, through the APP, not to view any text information generated by other users, or not to display operation messages of other users.

Those skilled in the art should understand that all or a part of steps in the above methods can be implemented by related hardware as instructed by a program, the program being stored in computer readable media, such as Read-Only Memory, magnetic discs or optical discs. Optionally, all or a part of steps in the above embodiments may also be implemented by one or more integrated circuits. Correspondingly, the modules/units in the above embodiments may be implemented in the form of hardware, or in the form of software functional modules. The present application is not limited to a combination of hardware and software in any specific form.

The present application may have a variety of other embodiments. Without departing from the spirit and essence of the present application, those skilled in the art may make various corresponding modifications and variations according to the present application. However, all these corresponding modifications and variations shall be encompassed by the scope defined by the claims of the present application.

The invention claimed is:

1. A data processing method, comprising:
converting audio and video data into broadcast data in a predetermined format, and performing speech recognition on audio data in the audio and video data;
in response to text information obtained from the speech recognition comprising a preset keyword, converting the text information to a corresponding operation instruction according to a preset corresponding relationship between the keyword and the operation instruction, and sending the operation instruction to a network device; and
in response to the text information obtained from the speech recognition not comprising the preset keyword, adding text information obtained from speech recognition into the broadcast data.

2. The method according to claim 1, wherein the performing speech recognition on the audio data in the audio and video data comprises:
segmenting the audio data in the audio and video data; and
performing speech recognition on the segmented audio data segment by segment.

3. The method according to claim 2, wherein the segmenting the audio data in the audio and video data comprises:
segmenting the audio data in the audio and video data at one or more intervals with energy continuously lower than a predetermined threshold for over a predetermined time length.

4. The method according to claim 1, wherein the adding the text information obtained from speech recognition into the broadcast data comprises:
generating subtitles according to the text information obtained from speech recognition; and
incorporating the generated subtitles, according to time axis information, into the broadcast data.

5. The method according to claim 1, wherein the converting audio and video data into broadcast data in a predetermined format comprises:
encoding the audio and video data; and
packaging the encoded audio and video data into a code stream of streaming media.

6. The method according to claim 1, wherein the converting audio and video data into broadcast data in a predetermined format, and performing speech recognition on the audio data in the audio and video data comprises:
converting the audio and video data, frame by frame, into the broadcast data in a predetermined format, and placing the broadcast data into a first FIFO (first-in-first-out) queue; and
performing speech recognition on the audio data in the audio and video data, and placing the text information obtained from speech recognition into a second FIFO queue.

7. The method according to claim 6, wherein the adding the text information obtained from speech recognition into the broadcast data comprises:

extracting the broadcast data from the first FIFO queue, and extracting corresponding text information from the second FIFO queue;

adding the extracted text information into the extracted broadcast data; and placing the broadcast data with the added text information into a third FIFO queue.

8. A live broadcasting method, comprising:

collecting audio and video data;

converting the collected audio and video data into a code stream of streaming media, and performing speech recognition on the audio data in the audio and video data;

in response to text information obtained from the speech recognition comprising a preset keyword, converting the text information to a corresponding operation instruction according to a preset corresponding relationship between the keyword and the operation instruction, and sending the operation instruction to a network device; and in response to the text information obtained from the speech recognition not comprising the preset keyword, adding text information obtained from speech recognition into the code stream of streaming media, and sending the code stream of streaming media with the added text information to a source site of a content delivery network.

9. A data processing method, comprising:

receiving broadcast audio and video data from a network device for broadcasting;

collecting speech data from the audio and video data during the broadcasting process;

performing speech recognition on the collected speech data;

in response to text information obtained from the speech recognition comprising a preset keyword, converting the text information to a corresponding operation instruction according to a preset corresponding relationship between the keyword and the operation instruction, and sending the operation instruction to the network device; and in response to the text information obtained from the speech recognition not comprising the preset keyword, sending the text information obtained from the speech recognition to the network device.

10. The method according to claim 9, wherein the performing speech recognition on the collected speech data comprises:

segmenting the collected speech data; and performing speech recognition on the segmented speech data segment by segment.

11. The method according to claim 10, wherein the segmenting the collected speech data comprises:

segmenting the collected speech data at one or more intervals with energy continuously lower than a predetermined threshold for over a predetermined time length.

12. The method according to claim 9, wherein the method further comprises:

displaying the text information obtained from the speech recognition.

13. A data processing device, comprising a non-transitory computer-readable memory and a processor, wherein:

the memory stores a program for data processing; and the program for data processing, when executed by the processor, causes the device to:

convert audio and video data into broadcast data in a predetermined format, and perform speech recognition on audio data in the audio and video data;

in response to text information obtained from the speech recognition comprising a preset keyword, convert the text information to a corresponding operation instruction according to a preset corresponding relationship between the keyword and the operation instruction, and send the operation instruction to a network device; and in response to the text information obtained from the speech recognition not comprising the preset keyword, add the text information obtained from speech recognition into the broadcast data.

14. The data processing device according to claim 13, wherein to perform speech recognition on the audio data in the audio and video data, the program, when executed by the processor, further causes the device to:

segment the audio data in the audio and video data; and perform speech recognition on the segmented audio data segment by segment.

15. The data processing device according to claim 14, wherein to segment the audio data in the audio and video data, the program, when executed by the processor, further causes the device to:

segment the audio data in the audio and video data at one or more intervals with energy continuously lower than a predetermined threshold for over a predetermined time length.

16. The data processing device according to claim 13, wherein to add the text information obtained from speech recognition into the broadcast data, the program, when executed by the processor, further causes the device to:

generate subtitles according to the text information obtained from speech recognition; and incorporate the generated subtitles, according to time axis information, into the broadcast data.

17. The data processing device according to claim 13, wherein to convert audio and video data into broadcast data in a predetermined format, the program, when executed by the processor, further causes the device to:

encode the audio and video data; and package the encoded audio and video data into a code stream of streaming media.

18. The data processing device according to claim 13, wherein to convert audio and video data into broadcast data in a predetermined format, and perform speech recognition on the audio data in the audio and video data, the program, when executed by the processor, further causes the device to:

convert the audio and video data, frame by frame, into the broadcast data in a predetermined format, and place the broadcast data into a first FIFO (first-in-first-out) queue; and perform speech recognition on the audio data in the audio and video data, and place the text information obtained from speech recognition into a second FIFO queue.

19. The data processing device according to claim 18, wherein to add the text information obtained from speech recognition into the broadcast data, the program, when executed by the processor, further causes the device to:

extract the broadcast data from the first FIFO queue, and extract corresponding text information from the second FIFO queue;

add the extracted text information into the extracted broadcast data; and place the broadcast data with the added text information into a third FIFO queue.

20. A data processing device, comprising a non-transitory computer-readable memory and a processor, wherein:
the memory stores a program for data processing; and
the program for data processing, when executed by the processor, causes the device to:
collect audio and video data;
convert the collected audio and video data into a code stream of streaming media, and concurrently, perform speech recognition on audio data in the audio and video data;
in response to text information obtained from the speech recognition comprising a preset keyword, convert the text information to a corresponding operation instruction according to a preset corresponding relationship between the keyword and the operation instruction, and send the operation instruction to a network device; and
in response to the text information obtained from the speech recognition not comprising the preset keyword, add text information obtained from speech recognition into the code stream of streaming media, and send the code stream of streaming media with the added text information to a source site of a content delivery network.

21. A data processing device, comprising a non-transitory computer-readable memory and a processor, wherein:
the memory stores a program for data processing; and
the program for data processing, when read and executed by the processor, causes the device to:
receive broadcast audio and video data from a network device for broadcasting;
collect speech data from the audio and video data during the broadcasting process;
perform speech recognition on the collected speech data;
in response to text information obtained from the speech recognition comprising a preset keyword, convert the text information to a corresponding operation instruction according to a preset corresponding relationship between the keyword and the operation instruction, and send the operation instruction to a network device; and
in response to the text information obtained from the speech recognition not comprising the preset keyword, send the text information obtained from the speech recognition to the network device.

22. The data processing device according to claim 21, wherein to perform speech recognition on the collected speech data, the program, when executed by the processor, further causes the data processing device to:
segment the collected speech data; and
perform speech recognition on the segmented speech data segment by segment.

23. The data processing device according to claim 22, wherein to segment the collected speech data, the program, when executed by the processor, further causes the data processing device to:
segment the collected speech data at one or more intervals with energy continuously lower than a predetermined threshold for over a predetermined time length.

24. The data processing device according to claim 21, wherein the program, when executed by the processor, further causes the data processing device to:
display the text information obtained from the speech recognition.

* * * * *